O. RASH.
NON-SKID DEVICE FOR AUTOMOBILES.
APPLICATION FILED MAR. 24, 1910.
990,005.
Patented Apr. 18, 1911.
2 SHEETS—SHEET 1.
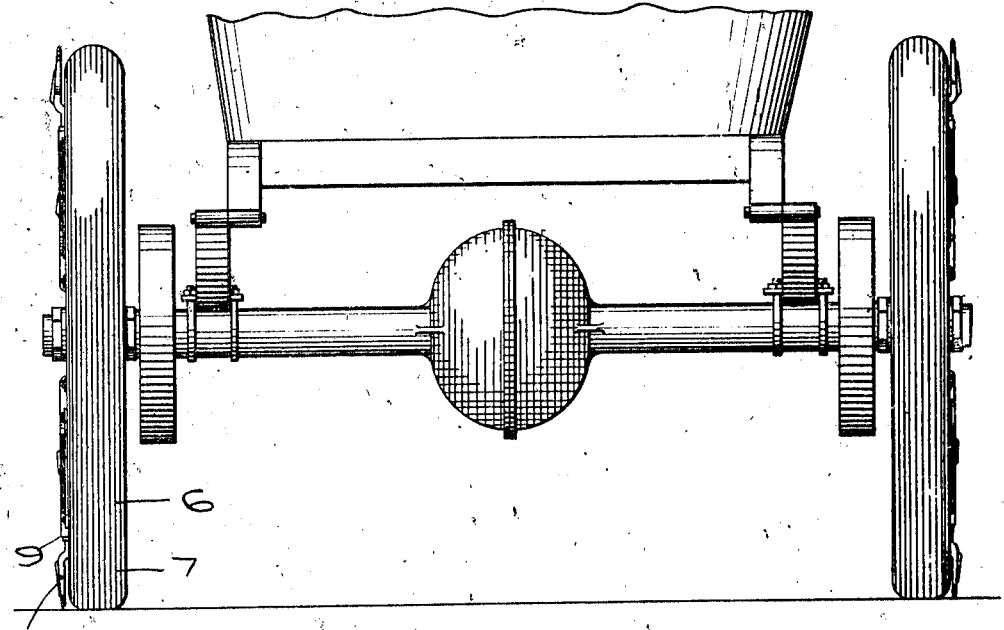
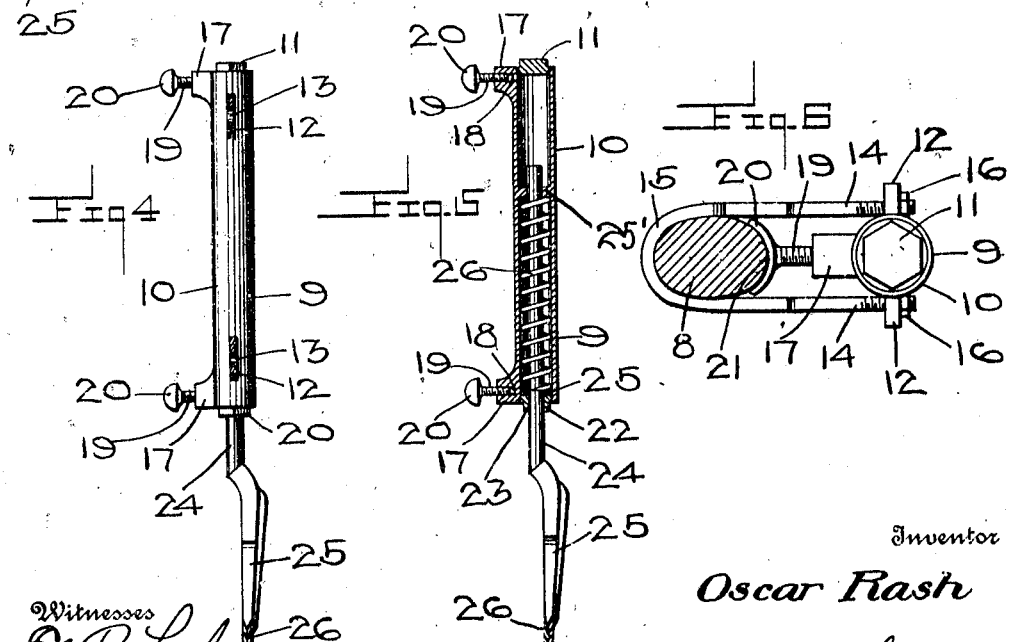
Inventor
Oscar Rash

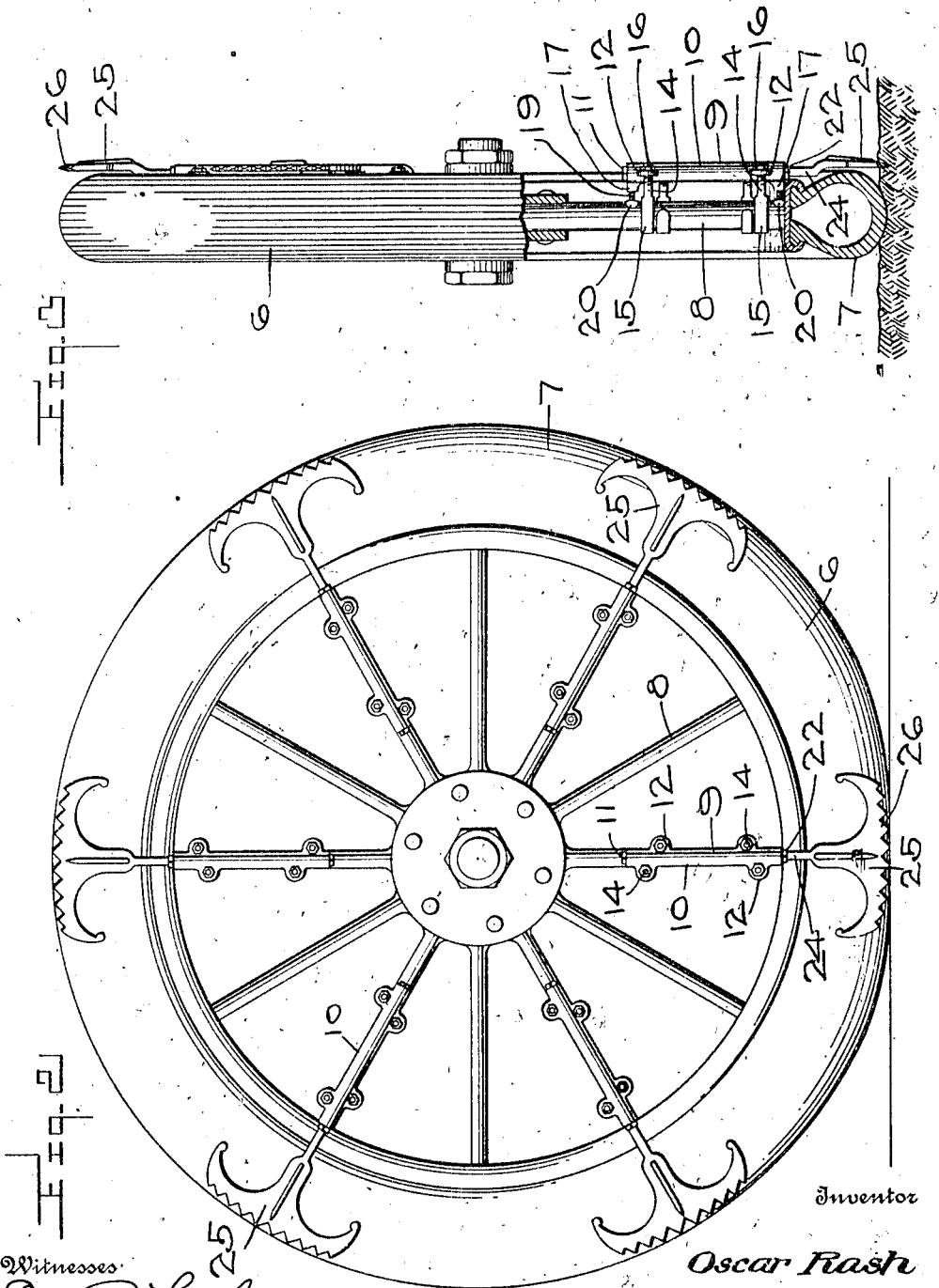

UNITED STATES PATENT OFFICE.

OSCAR RASH, OF OAKLAND, CALIFORNIA.

NON-SKID DEVICE FOR AUTOMOBILES.

990,005.      Specification of Letters Patent.      Patented Apr. 18, 1911.

Application filed March 24, 1910. Serial No. 551,294.

*To all whom it may concern:*

Be it known that I, OSCAR RASH, a citizen of the United States, residing at Oakland, in the county of Alameda and State of California, have invented certain new and useful Improvements in Non-Skid Devices for Automobiles, of which the following is a specification.

This invention relates to automobiles, and more particularly to wheel grips for use in connection with automobiles, and has for its object to provide a grip which will be simple and cheap, and which, primarily, may be attached to the wheel in a way to prevent skidding or slipping of the driving wheel, without having a detrimental and wearing effect upon the tire.

Another object is to provide a structure in which the devices may be quickly and easily attached or detached.

Other objects and advantages will be apparent from the following description, and it will be understood that changes in the specific structure shown and described may be made within the scope of the claim without departing from the spirit of the invention.

In the drawings forming a portion of this specification, and in which like numerals of reference indicate similar parts of the several views,—Figure 1 is a view showing the rearward portion of an automobile, the wheels of which are equipped with the present device. Fig. 2 is an enlarged elevational view of a wheel, showing the action of the gripping head upon a hard surface. Fig. 3 is an edge view of the wheel showing the action of the gripping head upon a soft surface. Fig. 4 is a view of one of the devices detached from the wheel. Fig. 5 is a longitudinal section taken through the cylinder, the interior portion being shown in elevation. Fig. 6 is an inner end view of the cylinder.

Referring now to the drawings, there is shown an automobile wheel 6 provided with a circumscribing pneumatic tire 7 and including spokes 8.

The present traction device is indicated at 9, and includes a cylinder 10 open-ended, as shown, but having a rearward closing plug 11 screwed thereinto. In diametrically opposite position upon the sides of the cylinder, there are ears 12, but the ears at one side are offset to lie between the ears at the other side, as shown. Each of these ears is provided with an opening 13, receiving the threaded stem 14 of a spoke engaging hook 15, these hooks extending beyond the cylinder for engagement around the spoke 8 to which the cylinder is attached, as shown in the drawings. The outer ends of the stem 14 are provided with clamping nuts 16 which may be operated to clamp the hook 15 against the spoke.

At that portion of the cylinder 10 which is directed toward the spoke, the cylinder has at each end a boss 17, provided with an interiorly threaded chamber 18, receiving the threaded stem 19 of a spoke engaging member 20. This member 20 is elongated laterally of the cylinder, and has a concave spoke engaging surface 21. These members 20 may thus be screwed into or out of the chambers 18 and thus adjusted to properly engage the spoke, or, in some instances, the rim of the wheel, and thus properly adjust the position of the cylinder. At the opposite end of the cylinder from the plug 11, it being understood that the plug is directed toward the center of the wheel while the opposite end is directed toward the periphery, there is a centrally apertured plug 22, which is screwed into the cylinder, and through the aperture 23 of which there is passed a plunger 24. This plunger carries a piston 25 near the plug 22, which moves snugly within the cylinder, and within the cylinder there is located a resilient body 26 which is arranged to bear against the piston 25 and against a web 25' to hold the plunger normally projected. This body 26 is shown as a spring, but it will be understood that it may be compressed air, or any other suitable agent. At its outer end the plunger 24 is provided with a gripping head 25 which extends laterally beyond the plunger peripherally of the wheel and this head is provided with serrations 26 at its outer edge. It will thus be seen that, normally, the head 25 is projected and grips the surface over which the tire travels, the compressibility of the tire permitting this gripping. When striking a stone or a hard surface, however, the plunger may be forced inwardly, which will relieve the stress upon the head, which would otherwise result if it were rigid.

What is claimed is:

A traction grip for tires comprising a cylinder, spoke engaging hooks having threaded stems slidably engaged with the cylinder, nuts engaged with the threaded stems for operation to adjust the hooks with respect to the cylinder, said cylinder having threaded recesses therein, spoke engaging members having threaded stems engaged in the recesses for adjustment of the members with respect to the cylinder, a plunger slidably engaged in the cylinder, means for holding the plunger yieldably projected, and a traction head carried by the plunger.

In testimony whereof I affix my signature, in presence of two witnesses.

OSCAR RASH.

Witnesses:
FRANK DE MELLOR,
C. M. SPENCER.